J. L. & D. H. Coles,

Nutmeg Grater,

No. 3,134, Reissued Sept. 22, 1868.

Witnesses.
E. F. Kastenhuber
C. Wahlers.

Inventor.
J. L. Coles.
D. H. Coles,
by Van Santvoord & Hauff. Attys

N. PETERS, PHOTO-LITHOGRAPHER, WASHINGTON, D. C.

United States Patent Office.

J. L. COLES AND D. H. COLES, OF NEW YORK, N. Y.

*Letters Patent No.* 80,456, *dated July* 28, 1868; *reissue No.* 3,134, *dated September* 22, 1868.

IMPROVED NUTMEG-GRATER.

The Schedule referred to in these Letters Patent and making part of the same.

TO ALL WHOM IT MAY CONCERN:

Be it known that we, J. L. COLES and D. H. COLES, of the city, county, and State of New York, have invented a new and improved Grater for Nutmegs, &c.; and we do hereby declare the following to be a full, clear, and exact description thereof, which will enable those skilled in the art to make and use the same, reference being had to the accompanying drawing, forming part of this specification, in which drawing—

Similar letters indicate corresponding parts.

This invention relates to a grate, which is provided with a revolving carrier, containing a series of chambers for the reception of the nutmegs or other articles to be ground, each chamber being furnished with a follower and spring, whereby the nutmegs, or other articles to be ground, are forced against the stationary grating-surface, which is combined with a receiver in such a manner that, by grasping the box, and turning the handle of the revolving carrier, the operation of grating can be performed with great ease and facility.

The grating-surface is produced by suitable punches applied to a piece of sheet metal, and it is provided with a slot or recess in front of each tooth or cutter, said slot or recess being formed by actually cutting out or leaving out a portion of the metal, in such a manner that a grating-surface is obtained which is not liable to clog up like a grating-surface of the ordinary shape or construction.

A represents a cylindrical box, made of tinned sheet iron, or any other suitable material, and provided with a hinged lid, B, through which access can be had to the interior of said box.

The heads of the box form the bearings for a shaft, C, on which is mounted the carrier D, which consists of a series of chambers, *a*, with intermediate spaces, *b*. Each of the chambers *a* is provided with a follower, *c*, which is subjected to the action of a spring, *d*, so that a nutmeg or other article placed into one of the chambers is continually forced against the grating-surface E. The intermediate spaces, *b*, are intended for the reception of the surplus nutmegs.

The grating-surface E is stationary, and it extends all round the carrier D, so that, by imparting to said carrier a revolving motion, the nutmegs or other articles contained in the chamber *c* are brought in contact with said grating-surface, and the operation of grating is effected with great expedition. A handle or crank, *e*, serves to turn the shaft C and carrier D.

The grating-surface consists of teeth, *f*, which are raised by suitable punches, and in front of each tooth is a slot or recess, *g*, formed by actually cutting out or leaving out a portion of the metal, so that the particles cut off from the article to be grated are free to escape, and the clogging up of the grating-surface is effectually avoided.

Figure 1:
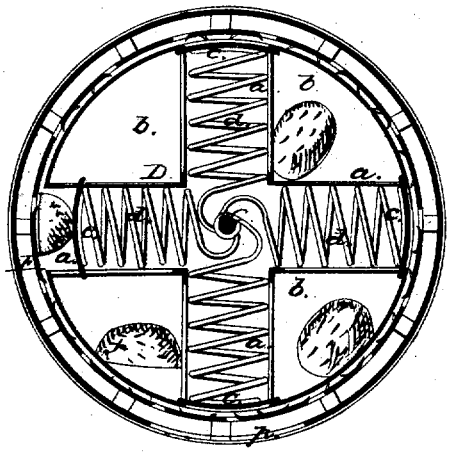
Figure 1 represents a horizontal section of this invention.
Figure 2:
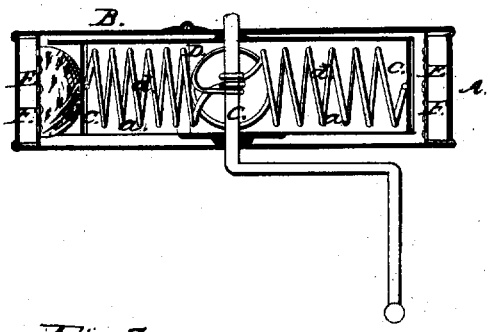
Figure 2 is a transverse section thereof.
Figure 3:
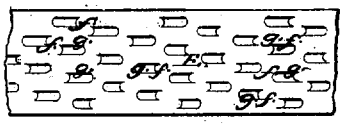
Figure 3 is a plan of the grating-surface detached.
Figure 4:
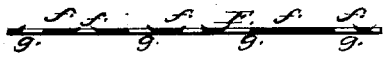
Figure 4 is a transverse section thereof.

The grating-surface may be made double-acting, or so that it cuts in either direction, by providing the same with a double set of teeth, one set facing in one, and the other in the oppsite direction, as shown in figs. 3 and 4. If such a grating-surface is used, the carrier D can be turned in either direction without changing the effect.

The grating-surface E is surrounded by an annular receiver, F, in which the particles cut off from the articles to be grated collect, and these particles are discharged through an aperture, *h*, in the circumference of the box A.

If desired, the chambers *a* may be placed in a vertical position, and the grating-surface, in this case, would be a flat stationary plate, secured in the box A, under the carrier, and over the receiver F.

By these means, a grater for nutmegs and other articles is obtained which is not liable to clog up, and which can be handled and operated with great ease and convenience, the operator being enabled to take a firm hold of the box A, so that he or she can turn the handle without difficulty.

We are aware that nutmeg-graters have heretofore been constructed with a series of chambers radiating from the centre of a spherical grater, and provided with spring-followers whereby the nutmegs or other articles are pressed up against the grater. This arrangement we do not claim as our invention.

We are also aware that grating-surfaces have been made with throats in front of the teeth, but we do not know of any grating-surface provided with slots formed by actually cutting out or leaving out a portion of the metal in front of each tooth.

Having thus described our invention, what we claim as new, and desire to secure by Letters Patent, is—

A box, A, containing a revolving carrier, D, having a series of chambers with spring-followers, which press the articles to be grated against the stationary grating-surface E, which is combined with a receiver, F, all as shown and described.

Also, the combination, with the cylindrical box A, of a series of carriers at angles to each other, so as to leave supplementary chambers, *b*, substantially as and for the purpose set forth.

Also, the slots or openings, *g*, in front of the teeth *f* of the grating-surface, said slots being formed by actually cutting or leaving out a portion of the metal, substantially as and for the purpose described.

J. L. COLES,
D. H. COLES.

Witnesses:
W. HAUFF,
E. F. KASTENHUBER.